United States Patent

Leurent et al.

[11] Patent Number: 5,933,458
[45] Date of Patent: Aug. 3, 1999

[54] CIRCUIT FOR PROCESSING ASYNCHRONOUS SIGNALS HAVING PERIODIC SYNCHRONIZATION BURSTS

[75] Inventors: Patrice Leurent, Saint Egreve; Jean-Pierre Lagarde, Saint Martin le Vinoux, both of France

[73] Assignee: STMicroelectronics, S.A., Gentilly, France

[21] Appl. No.: 08/608,091

[22] Filed: Feb. 28, 1996

[30] Foreign Application Priority Data

Feb. 28, 1995 [FR] France .................................. 95 02538

[51] Int. Cl.⁶ .......................... H04N 7/087; H04L 25/06; H04L 27/10; H03L 5/00
[52] U.S. Cl. .......................... 375/317; 375/318; 375/342; 348/464
[58] Field of Search ..................... 375/286, 287, 375/316, 317, 318, 319, 340, 342, 345, 346, 354, 357, 359, 360, 362, 363, 364, 365, 369, 370; 455/3.1, 6.1, 6.2; 371/5.1, 5.3, 5.4, 48, 47.1, 57.1, 57.2, 64; 327/1, 2, 5, 7, 18, 31, 35, 37, 50, 51, 52, 54, 56, 58, 60, 72, 63, 69, 70, 71, 73, 100, 205; 331/17, 18, 20; 348/461, 464, 465, 466, 468, 525, 529, 532, 533, 534, 535, 547, 548; 358/142, 147; 330/11, 252, 259, 260, 270, 290, 293, 295, 75, 82, 84, 85, 88, 90, 93, 98, 99, 100, 102, 103, 104, 112; 341/148, 154

[56] References Cited

U.S. PATENT DOCUMENTS

| | | | |
|---|---|---|---|
| 4,458,206 | 7/1984 | Dellande et al. | 329/50 |
| 4,581,731 | 4/1986 | Tomikashi et al. | 370/4 |
| 4,823,360 | 4/1989 | Tremblay et al. | 375/4 |
| 5,223,930 | 6/1993 | Zato | 358/147 |
| 5,561,469 | 10/1996 | Schultz | 348/476 |

FOREIGN PATENT DOCUMENTS

| | | |
|---|---|---|
| 0128473 | 12/1984 | European Pat. Off. . |
| 0421897 | 4/1991 | European Pat. Off. . |
| 0 531 549 A1 | 3/1993 | European Pat. Off. . |
| 0 594 246 A1 | 4/1994 | European Pat. Off. . |
| 57-203384 | 12/1982 | Japan . |

Primary Examiner—Alpus H. Hsu
Assistant Examiner—William Luther
Attorney, Agent, or Firm—David V. Carlson; Seed and Berry LLP

[57] ABSTRACT

A circuit for restoring bits transmitted by an asynchronous signal includes a first comparator for comparing the level of the asynchronous signal with a first threshold adjusted as a function of the output of the first comparator during synchronization bursts of the asynchronous signal, and at least a second comparator for comparing the level of the asynchronous signal with a second threshold correlated to the first threshold.

15 Claims, 3 Drawing Sheets

CIRCUIT FOR PROCESSING ASYNCHRONOUS SIGNALS HAVING PERIODIC SYNCHRONIZATION BURSTS

BACKGROUND OF THE INVENTION

1. Field of the Invention

The present invention relates to circuits for restoring logic levels of bits transmitted by a signal asynchronously and in series. The present invention more particularly relates to cases in which the transmission signal periodically has synchronization bursts for periodically readjusting the processing circuit.

2. Discussion of the Related Art

FIG. 1 represents an exemplary waveform of a signal S for transmitting teletext information. The teletext information is transmitted during non-visible lines of a television picture. Thus, each "line" of the teletext signal is preceded by a line synchronization pulse Hs. Shortly after this pulse Hs, a synchronization burst SB starts which has a mean level higher than the level preceding the burst. This burst includes, for example, eight sine wave periods. The half-period of these sine waves corresponds to the nominal transmission duration of the bits that follow. Thus, the effective signal Tx for transmitting the bits starts immediately after the synchronization burst SB. In this example, the transmission starts with the bits 11100100100110110.

Depending upon the reception conditions, a teletext signal may be noisy and have a variable width and phase. With the synchronization burst SB at the beginning of each teletext line, the processing circuit can periodically readjust the phase of its reception frequency and a discrimination threshold for differentiating the high logic levels from the low logic levels during the effective transmission of signal Tx. U.S. Pat. No. 5,136,382 describes such a processing circuit. In this circuit, the discrimination threshold follows the mean change over time of signal S until a portion of the synchronization burst has passed, so that the discrimination threshold establishes at the mean value of the synchronization burst. Then, the discrimination threshold is held constant during the effective transmission of signal Tx.

In order to determine when the discrimination threshold is to be fixed, it is necessary to detect the occurrence of the synchronization burst SB. Indeed, the time interval separating this burst from the synchronization pulse Hs randomly varies about a nominal value with a relatively large tolerance. For this purpose, for example, the crossing of the discrimination threshold by signal S is detected after the synchronization pulse Hs. Since the discrimination threshold follows the mean change over time of signal S, this discrimination threshold is lower than the sine waves of the burst at the beginning of the synchronization burst. To decrease the possibility of spurious detections caused by the noise of signal S, this detection is enabled as late as possible after the synchronization pulse Hs and only if signal S satisfies a criterion, for example, if the discrimination threshold is exceeded for a predetermined time.

Despite the precautions taken, it may happen, if noise is excessive, that this detection criterion of the synchronization burst is satisfied before the effective occurrence of the burst. As a consequence, the discrimination threshold is fixed at a wrong value, which causes erroneous interpretations of the bits of portion Tx of the signal.

Moreover, depending upon the reception conditions, the teletext signal may be subject to high frequency losses, especially if the teletext signal is Nyquist filtered for reducing spurious echo phenomena (inter-symbol modulation).

FIG. 2 represents an exemplary waveform of the portions SB and Tx of the signal of FIG. 1 subject to high frequency losses. The synchronization burst SB, of relatively high frequency, is substantially attenuated. However, because of the symmetry of the burst SB, its mean value is not altered, which allows a suitable establishment of the discrimination threshold Vref Problems may arise especially when transmitting isolated 1's preceded and followed by at least two 0's, as for the sixth and ninth transmitted bits shown in FIG. 2, or when transmitting isolated 0's preceded and followed by at least two 1's, as for the fourteenth and seventeenth transmitted bits shown in FIG. 2. Indeed, by transmitting several consecutive bits at the same state, the signal may vary for the duration of these several bits, which enables the signal to reach its maximum excursion. In contrast, if the bit transmitted immediately after is at a different isolated state, the signal can only vary for the duration of a single bit, which generally prevents it from reaching its maximum excursion. In this case, as shown for the sixth, ninth, fourteenth and seventeenth bits of FIG. 2, signal S hardly exceeds the discrimination threshold Vref It is then highly probable, especially because of noise, that erroneous states of the bits are sampled. In addition, in some cases, signal S does not reach the threshold Vref

SUMMARY OF THE INVENTION

As object of the present invention is to provide a circuit, which may be called an "intermediate" circuit, having many applications when supplemented by other circuits. More particularly, this intermediate circuit can be used according to the invention to improve the reliability of the detection of synchronization bursts and to limit the sampling errors of bits when the signal is subject to high frequency losses.

To achieve this object, the present invention provides a circuit for restoring the bits transmitted by an asynchronous signal, including a first comparator for comparing the level of the asynchronous signal with a first threshold that is adjusted as a function of the output of the first comparator during synchronization bursts of the asynchronous signals. The circuit further comprises at least a second comparator for comparing the level of the asynchronous signals with a second threshold correlated to the first threshold.

According to an embodiment of the invention, the restoring circuit includes a third comparator for comparing the level of the asynchronous signals with a third threshold correlated to the first threshold so that the first threshold varies between the second and third thresholds.

Furthermore, the invention applies to a method for detecting synchronization bursts. Detection is achieved when the output of the second comparator satisfies a predetermined evolution criterion. The second threshold is shifted with respect to the first threshold in the same direction as the mean level of the burst with respect to the mean level of the asynchronous signal preceding the burst.

The present invention also relates to a method for limiting bit restoration errors, by periodically polling the output state of the first comparator and assigning it to the bit to restore. If the outputs of the second and third comparators are at different states when a state of the output of the first comparator is polled, the complement of the state of the corresponding preceding restored bit is assigned to the bit previously restored.

According to an embodiment of the invention, the complement of the state of the preceding bit is assigned to the bit to restore only if the outputs of the second and third comparators were at identical states for the preceding bit.

According to an embodiment of the invention, the complement of the state of the preceding bit is assigned to the bit to restore only if the asynchronous signal has high frequency losses.

According to an embodiment of the invention, the high frequency losses are detected if the difference between the duty cycles of the output signals of the second and third comparators during synchronization bursts exceed in absolute value a predetermined threshold.

BRIEF DESCRIPTION OF THE DRAWINGS

The foregoing and other objects, features, aspects and advantages of the invention will become apparent from the following detailed description of the present invention when taken in conjunction with the accompanying drawings.

DETAILED DESCRIPTION

Figure 3:
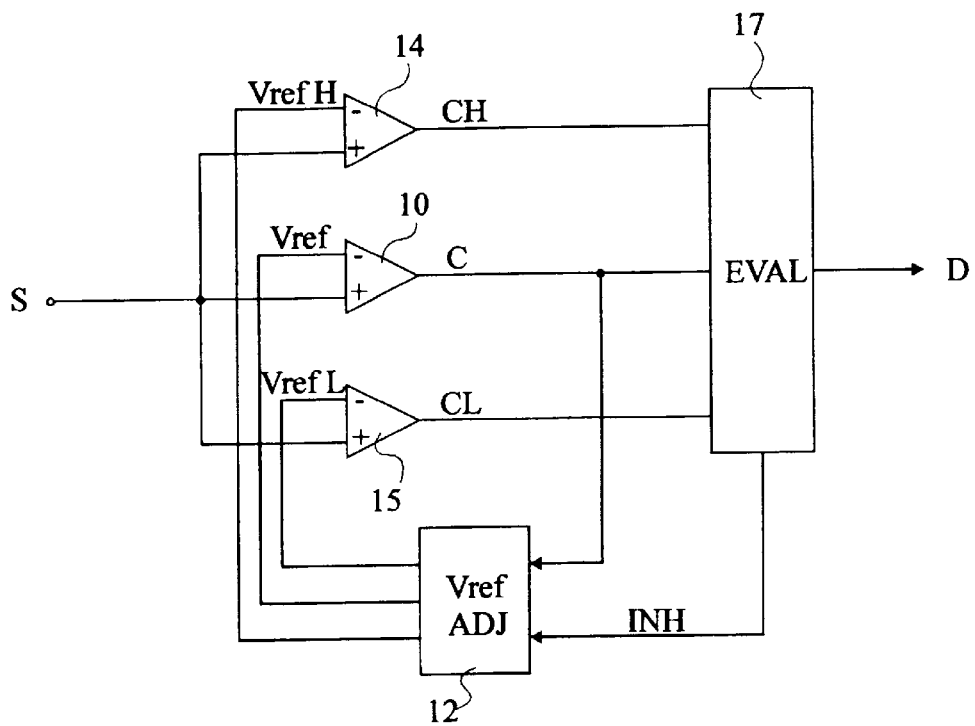
FIG. 3 represents an embodiment of an intermediate circuit according to the invention.

In FIG. 3, a transmission signal S is compared with a discrimination threshold Vref by a comparator 10. The threshold Vref is provided by a circuit 12 which adjusts threshold Vref as a function of the states of output C of comparator 10. For example, circuit 12 includes an up/down counter timed by a fixed clock. The up-counting mode of this counter is selected by the high state of the output C and its down-counting mode is selected by the low state of output C. The content of the counter is converted into analog to provide the threshold Vref With this configuration, the threshold Vref follows the mean change over time of signal S. When it is desired to fix threshold Vref, the circuit 12 is provided with an inhibition signal INH which freezes the content of the counter.

According to the invention, the circuit 12 further provides a high threshold VreH greater than threshold Vref and, optionally, a low threshold VrefL smaller than threshold Vref. The transmission signal S is compared with these thresholds VrefH and VrefL by two respective comparators 14 and 15. Signal S is applied, for example, to the non-inverting inputs of comparators 14 and 15, the thresholds VrefL, Vref and VrefH are applied to the inverting inputs. Thresholds VrefH and VrefL are correlated to threshold Vref, i.e., they vary over time in parallel with threshold Vref. Thresholds VrefH and VrefL may be provided in various ways from threshold Vref, for example, by a digital-to-analog converter that provides the threshold VrefH a few conversion steps higher than threshold Vref and the threshold VrefL a few conversion steps lower than threshold Vref. Another possibility is to take threshold Vref at the center of a bridge of four resistors connected between two supply terminals. Threshold VrefH is then taken between the two resistors nearest to one of the terminals, and threshold VrefL is taken between the two resistors nearest to the other terminal.

The circuit described above as such has no specific function besides providing three distinct correlated voltages whose mean voltage follows the mean change over time of the transmission signal S. The respective outputs CH, C and CL of comparators 14, 10 and 15 are provided to an evaluation circuit 17 which is selected as a function of the desired application of the intermediate circuit according to the invention.

Figure 1:
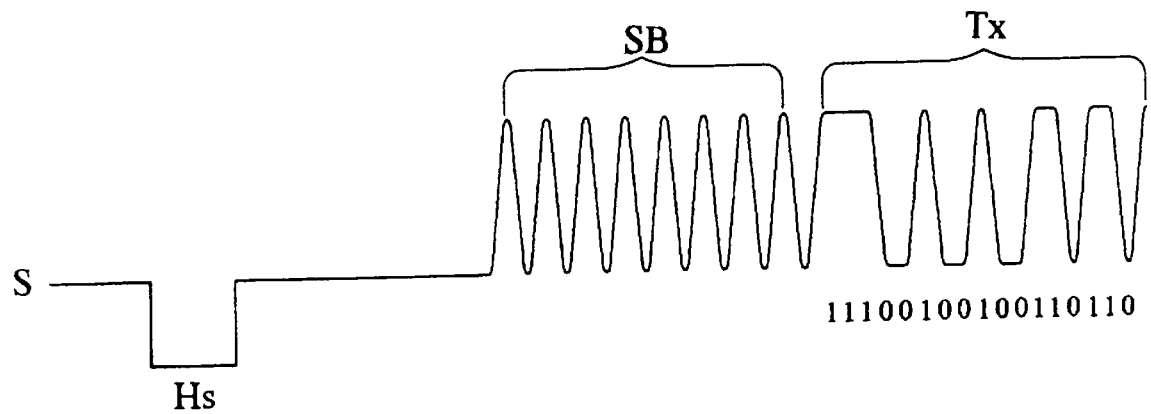
FIG. 1, above described, represents a nominal waveform of a signal for transmitting teletexts.

To improve the reliability of the detection of synchronization burst SB (FIG. 1), the evaluation circuit 17 is operative, according to the invention, to carry out the following. When it is desired to search for the presence of the synchronization burst SB, i.e., after a synchronization pulse Hs, the output CH of comparator 14 is considered instead of the output C of comparator 10. The threshold VrefH from comparator 14, which is higher than threshold Vref, is selected, for example, near, i.e., slightly above or below, the maximum noise amplitude of signal S. In this case, the output CH of comparator 14 has a very low probability of being at 1 before the occurrence of the synchronization burst SB, whereas the probability for the output C of comparator 10 to be at 1 or 0 is 50%, since the threshold Vref is at the mean value of the noise of signal S. As a consequence, the output CH has, in contrast to output C, a very low probability of unduly satisfying, because of noise, the criterion for detecting the beginning of the synchronization burst SB. Such a criterion is, for example, the presence of a state 1 at the output CH at least for approximately a half-period of the synchronization burst SB, followed by a transition to 0.

As soon as the detection criterion is satisfied by the output CH, the circuit waits for the time required by the threshold Vref to reach half the amplitude of the burst SB. Then, the threshold Vref and, as a consequence, thresholds VrefH and VrefL, are fixed by enabling the inhibition signal INH of the adjustment circuit 12. the thresholds are held at least to the end of the transmission portion Tx of signal S.

Of course, the detection of the synchronization burst SB can be followed by a confirmation. The detection generally occurs at the first rising half-period of burst SB. Confirmation can be achieved by detecting in respective windows one or more rising half-periods after the first half-period.

Figure 4:
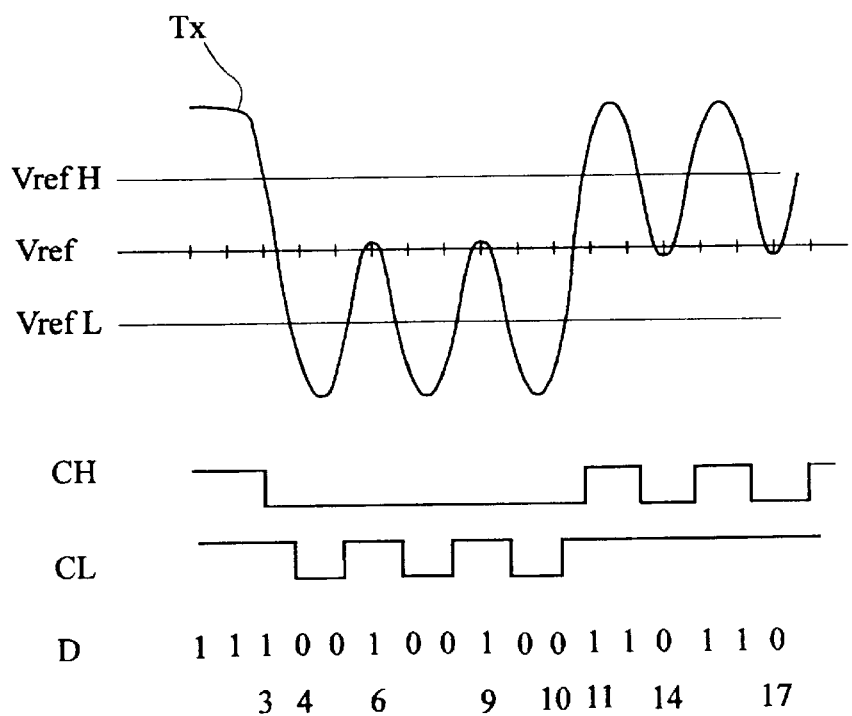
FIG. 4 represents signals of the circuit of FIG. 3 in an embodiment for limiting bit transmission errors when the transmission signal is subject to high frequency losses.

FIG. 4 represents waveforms of signals of the circuit of FIG. 3 and is intended to illustrate the operation of an evaluation circuit 17 according to the invention for limiting bit sampling errors when signal S is subject to high frequency losses.

Figure 2:
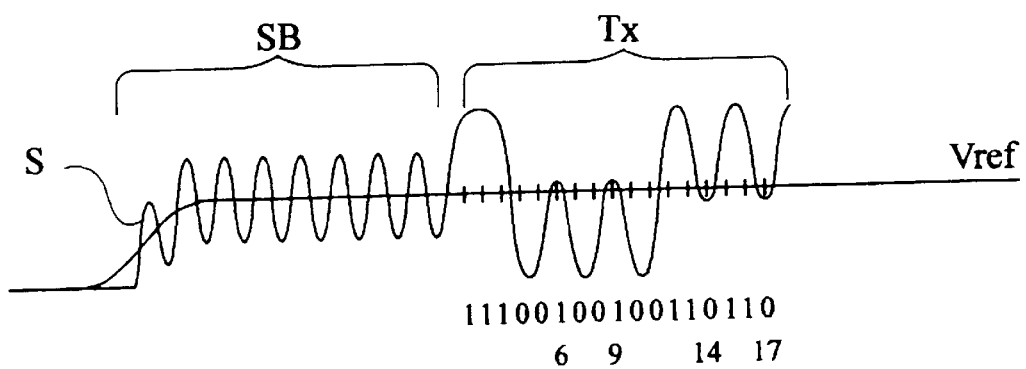
FIG. 2 represents a waveform of the signal of FIG. 1 when the signal is subject to high frequency losses.

FIG. 4 shows an enlarged view of the transmission portion Tx of the signal S of FIG. 2 with high frequency losses. The three thresholds Vref, VrefH and VrefL are shown in FIG. 4. The corresponding variations of outputs CH and CL of comparators 14 and 15 are also represented with data D to be provided by the evaluation circuit 17. In FIG. 4, the bits D are shown in coincidence with sampling periods represented by vertical lines on threshold Vref In normal cases, each transition of signal S crosses the three thresholds VrefH, Vref and VrefL. Outputs CH and CL then have transitions in the same direction, slightly shifted one with respect to another. These normal cases are represented in FIG. 4 for the falling transition between the third and fourth bits and for the rising transition between the tenth and eleventh bits.

In contrast, signal S crosses only two thresholds (possibly only one threshold) in the worst cases such as for the sixth, ninth, fourteenth and seventeenth bits. For the sixth and ninth bits, the transitions of signal S cross thresholds Vref and VrefL only. For the fourteenth and seventeenth bits, the transitions of signal S cross thresholds Vref and VrefH only.

For all these worst case bits, output CH is at 0 and output CL is at 1, whereas for the other bits, outputs CH and CL are the same.

To avoid sampling errors of these limit bits, the case where the outputs CH and CL are distinct is detected and, when sampling the bits, instead of providing the result of the sampling, the complement of the preceding bit is provided. For example, for the sixth, ninth, fourteenth and seventeenth bits, the complement of the fifth, eighth, thirteenth and sixteenth bits are provided, respectively. In most cases, these preceding bits are not subject to sampling errors.

In very few cases, signal S could stabilize between the thresholds VrefL and VrefH without the sampling signal being erroneous (signal S is sufficiently far from the threshold Vref). In this case, the outputs CH and CL are always distinct and if the above-mentioned rule were applied, the provided bits would be erroneous. To avoid this problem, when the outputs CH and CL are distinct as one bit is sampled, the complement of the preceding bit is provided only if the outputs CH and CL were equal for this preceding bit, which corresponds to the case of FIG. 4.

Preferably, the above-described method for limiting sampling errors is not applied when signal S does not have high frequency losses. Indeed, signal S may then have inter-symbol modulation echoes which could cause erroneous interpretations of the states of outputs CH and CL (if the echo occurs at a sampling time, the corresponding bit would be replaced with the complement of the preceding bit, which would be erroneous). Nyquist filtering, which causes high frequency losses in signal S, is precisely used to reduce the echo phenomenon.

Thus, prior to applying the above method for limiting errors, it may be necessary to detect whether signal S has high frequency losses.

Figure 5:
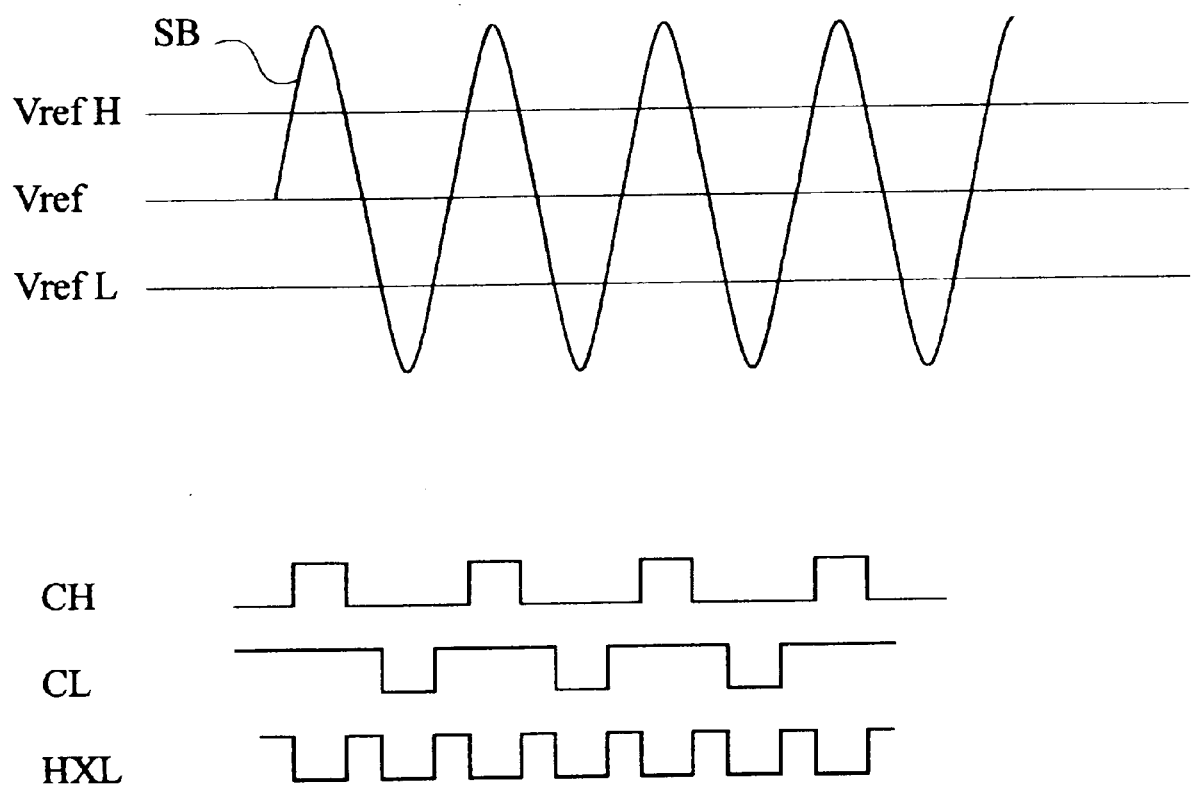
FIG. 5 represents signals of the circuit of FIG. 3 in an embodiment of the invention for detecting the occurrence of high frequency losses in the transmission signal.

FIG. 5 represents waveforms of signals of the circuit of FIG. 3 illustrating an application of this circuit for detecting whether signal S has high frequency losses. This detection is carried out during the synchronization bursts SB by considering a signal HXL which corresponds to an Exclusive-OR between the outputs CH and CL. During the synchronization burst SB, the outputs CH and CL are periodical and have different duty cycles. The difference between the duty cycles increases as the amplitude of burst SB decreases. When signal S has high frequency losses, the amplitude of burst SB is below its nominal value. Thus, to detect the presence of high frequency losses, it is sufficient to compare the difference between the duty cycles of signals CH and CL with a nominal difference. Signal HXL has pulses whose width corresponds in fact to the difference, in absolute value, between the duty cycles of signals CH and CL. To measure the width of the pulses of signal HXL, these pulses enable, for example, the incrementation at high frequency of a counter. After a predetermined amount of pulses, the state of the counter is examined. If the state of this counter exceeds a nominal value, it is signaled that signal S has high frequency losses and the method for limiting errors, which is described in relation with FIG. 4, is enabled.

Various applications according to the invention of the circuit of FIG. 3 have been described. Those skilled in the art can easily devise many technical solutions to achieve the described functions.

Although three possible applications of the circuit of FIG. 3 have been described (detection of synchronization burst, limitation of sampling errors, and detection of high frequency losses), those skilled in the art will be able to find many other applications.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

We claim:

1. A method for limiting bit restoration errors using a first comparator for comparing the level of the asynchronous signal with a first threshold only actively varied as a function of the output of the first comparator during synchronization bursts of the asynchronous signal, a second comparator for comparing the level of the asynchronous signal with a second threshold correlated to the first threshold, and a third comparator for comparing the level of the asynchronous signal with a third threshold correlated to the first threshold so that the first threshold varies between the second and third thresholds, and including the following steps:

periodically polling the output state of the first comparator and assigning it to the bit to restore; and if the outputs of the second and third comparators are at different states when a state of the output of the first comparator is polled, assigning to the corresponding restored bit the complement of the state of the bit previously restored.

2. The method for limiting bit restoration errors of claim 1, wherein the complement of the state of the previously restored bit is assigned to the bit to restore only if the outputs of the second and third comparators were at identical states for the previously restored bit.

3. The method for limiting bit restoration errors of claim 1, wherein the complement of the state of the previously restored bit is assigned to the bit to restore only if the asynchronous signal has high frequency losses.

4. The method for limiting bit restoration errors of claim 3, wherein the high frequency losses are detected if the difference between the duty cycles of the output signals of the second and third comparators during synchronization bursts exceeds in absolute value a predetermined threshold.

5. A method for detecting signals having high frequency losses using a first comparator for comparing the level of the asynchronous signal with a first threshold only actively varied adjusted as a function of the output of the first comparator during synchronization bursts of the asynchronous signal, a second comparator for comparing the level of the asynchronous signal with a second threshold correlated to the first threshold, and a third comparator for comparing the level of the asynchronous signal with a third threshold correlated to the first threshold so that the first threshold varies between the second and third thresholds, wherein a detection is achieved if the difference between the duty cycles of the output signals of the second and third comparators during synchronization bursts exceeds in absolute value a predetermined threshold.

6. A circuit for reading digital information from an information portion of an asynchronous signal including a synchronization burst that precedes said information portion and that has an average dc voltage value, said circuit comprising:

a first comparator having a first input coupled to receive said asynchronous signal, a second input, and an output, said first comparator operable to provide a first comparator signal at said output thereof;

a second comparator having a first input coupled to receive said asynchronous signal, a second input, and an output, said second comparator operable to provide a second comparator signal at said output thereof;

a third comparator having a first input coupled to receive said asynchronous signal, a second input, and an output, said third comparator operable to provide a third comparator signal at said output thereof;

a reference-voltage generator having a control input coupled to said output of said second comparator, and first, second, and third outputs respectively coupled to said second inputs of said first, second, and third comparators, said generator, in response to said second comparator signal, operable to generate on said second output a reference voltage substantially equal to said average dc value of said synchronization burst, to generate on said first output a reference-high voltage that is a first predetermined voltage above said reference voltage, and to generate on said third output a reference-low voltage that is a second predetermined voltage below said reference voltage; and an evaluation circuit having first, second, and third inputs respectively coupled to said outputs of said first, second, and third comparators, and having a data output said evaluation circuit operable to generate, in response to said first, second, and third comparator output signals, a data signal on said data output while said first, second, and third comparators receive said digital information.

7. The circuit of claim 6, wherein during said synchronization burst, said evaluation circuit is operable to exclusive-OR said first and third comparator output signals to determine the bandwidth of said asynchronous signal.

8. A method for reading digital bits of information from an information portion of an asynchronous signal that has a maximum noise voltage and a bandwidth, said asynchronous signal including a synchronization pulse and a synchronization burst that follows said pulse, precedes said information portion, and has an average dc voltage value, said method comprising:

detecting said synchronization burst;

setting a reference voltage substantially equal to said average dc voltage value;

generating a reference-high voltage a first predetermined voltage higher than said reference voltage and generating a reference-low voltage a second predetermined voltage lower than said reference voltage;

comparing said asynchronous signal to said reference-high, reference, and reference-low voltages during said information portion to respectively generate first, second, and third comparison signals; and converting said first, second, and third comparison signals into a data signal having bits that correspond to the digital bits of information.

9. The method of claim 8, wherein said detecting comprises:

detecting said synchronization pulse;

setting said reference-high voltage between said maximum noise voltage and a voltage that is a third predetermined voltage above said maximum noise voltage;

comparing said asynchronous signal with said reference-high voltage; and detecting said synchronization burst when said asynchronous signal exceeds said reference-high voltage.

10. The method of claim 8, wherein said setting comprises:

comparing said asynchronous signal to said reference voltage during said synchronous burst; and adjusting said reference voltage to substantially equal said average dc voltage value.

11. The method of claim 10, wherein said adjusting comprises:

increasing said reference voltage by a third predetermined amount at each of one or more predetermined time intervals if said asynchronous signal exceeds said reference voltage; and decreasing said reference voltage by said third predetermined amount at said each of said one or more predetermined time intervals if said reference voltage exceeds said asynchronous signal.

12. The method of claim 8, further comprising exclusive-ORing said first and third comparison signals during said synchronous burst to determine said bandwith of said asynchronous signal.

13. The method of claim 8, wherein said converting comprises:

generating a logic one for a bit of said data signal if, at a predetermined sampling time, said asynchronous signal exceeds said first comparison signal;

generating a logic one for said bit if, at said predetermined sampling time, said asynchronous signal exceeds said second comparison signal and an immediately preceding bit of said data signal is a logic zero;

generating a logic zero for said bit if, at said predetermined sampling time, said asynchronous signal is below said third comparison signal; and generating a logic zero for said bit if, at said predetermined sampling time, said asynchronous signal is below said second comparison signal and said immediately preceding bit is a logic one.

14. The method of claim 8, wherein said converting comprises:

generating a logic one for a bit of said data signal if, at a first predetermined sampling time, said asynchronous signal exceeds said first comparison signal;

generating a logic one for said bit if, at said first predetermined sampling time, said asynchronous signal exceeds said second comparison signal and, at a second predetermined sampling time that immediately precedes said first predetermined sampling time, said asynchronous signal is below said third comparison signal;

generating a logic zero for said bit if, at said first predetermined sampling time, said asynchronous signal is below said third comparison signal; and generating a logic zero for said bit if, at said first predetermined sample time, said asynchronous signal is below said second comparison signal and, at said second predetermined sample time, said asynchronous signal exceeds said first comparison signal.

15. The method of claim 8, wherein said converting comprises:

determining the bandwidth of said asynchronous signal;

generating a logic one for a bit of said data signal if, at a first predetermined sampling time, said asynchronous signal exceeds said first comparison signal;

generating a logic one for said bit if said bandwidth is below a predetermined frequency, said asynchronous signal exceeds said second comparison signal at said first predetermined sampling time, and at a second sampling time that immediately precedes said first predetermined sampling time, said asynchronous signal is below said third comparison signal;

generating a logic zero for said bit of said data signal if, at said first predetermined sampling time, said asynchronous signal is below said third comparison signal; and generating a logic zero for said bit if said bandwidth is below said predetermined frequency, said asynchronous signal is below said second comparison signal at said first predetermined sampling time, and, at said second predetermined sampling time, said asynchronous signal exceeds said first comparison signal.

* * * * *